(12) United States Patent
Nurmi

(10) Patent No.: US 7,401,300 B2
(45) Date of Patent: Jul. 15, 2008

(54) ADAPTIVE USER INTERFACE INPUT DEVICE

(75) Inventor: Mikko Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 558 days.

(21) Appl. No.: 10/755,111

(22) Filed: Jan. 9, 2004

(65) Prior Publication Data
US 2005/0154798 A1 Jul. 14, 2005

(51) Int. Cl.
*G06F 3/00* (2006.01)
*G06F 3/048* (2006.01)
*G06F 3/033* (2006.01)

(52) U.S. Cl. .................. 715/866; 715/815; 345/158

(58) Field of Classification Search .................. 715/762, 715/863, 764, 866, 700, 867, 702, 746, 865, 715/815, 744, 778; 345/158
See application file for complete search history.

(56) References Cited

U.S. PATENT DOCUMENTS

| | | | |
|---|---|---|---|
| 6,317,114 B1 | 11/2001 | Abali et al. | |
| 6,411,275 B1 | 6/2002 | Hedberg | |
| 6,415,224 B1 * | 7/2002 | Wako et al. | 701/208 |
| 6,466,198 B1 | 10/2002 | Feinstein | |
| 6,466,232 B1 * | 10/2002 | Newell et al. | 715/700 |
| 6,690,351 B1 * | 2/2004 | Wong | 345/156 |
| 6,816,154 B2 * | 11/2004 | Wong et al. | 345/175 |
| 6,933,923 B2 * | 8/2005 | Feinstein | 345/158 |
| 7,022,075 B2 * | 4/2006 | Grunwald et al. | 600/446 |
| 2002/0021278 A1 * | 2/2002 | Hinckley et al. | 345/156 |
| 2003/0046401 A1 * | 3/2003 | Abbott et al. | 709/228 |
| 2003/0085870 A1 * | 5/2003 | Hinckley | 345/156 |
| 2004/0145613 A1 * | 7/2004 | Stavely et al. | 345/863 |
| 2006/0026535 A1 * | 2/2006 | Hotelling et al. | 715/863 |

OTHER PUBLICATIONS

Laerhoven Kristof, Technology for Enabling Awareness, 2000, Http://www.teco.edu/tea/tea_obj.html, 1-16.*
Schmidt, et al.; Advanced Interaction in Context, 1999 Workshop: Handheld and Ubiquitous Computing (HUC99), Heidelberg, Germany.

* cited by examiner

*Primary Examiner*—Kieu D Vu
*Assistant Examiner*—Nicholas S Ulrich
(74) *Attorney, Agent, or Firm*—Foley and Lardner LLP

(57) ABSTRACT

The present invention relates to an adaptable user interface. The adaptable user interface provides a more error free input function as well as greater ease of use when being used during certain events such as while moving. A user interface in accordance with the principles of the present invention comprises a user input, at least one sensor, and a display unit functionally in communication with the at least one sensor and adapted to change its user interface input mode. The user interface is capable of adapting its user interface input in response to a stimulus sensed by the sensor.

35 Claims, 9 Drawing Sheets

ADAPTIVE USER INTERFACE INPUT DEVICE

FIELD OF THE INVENTION

The present invention relates generally to the field of user interfaces. The present invention relates more specifically to adaptive user interfaces.

BACKGROUND OF THE INVENTION

Conventional information and communication systems can include for example a user input device for facilitating user input, a display device for displaying information, and a processor for receiving, managing, and processing the user input and information. Many modern applications have merged the functions of the input device and the display device to create an intuitive, easy-to-use user interface.

Graphical user interfaces have been developed in which the display device displays a series of icons or menus which a user selects or manipulates with the user input device to provide user input. For example, in some systems the user input device comprises a pointing mechanism such as a mouse or joystick that can be used to manipulate a pointer over the icons or menu items displayed on the display device. The user can select an icon or menu item by positioning the pointer over the input area associated with the icon or menu item and hitting a select key.

Another example of a graphical user interface are those that comprise a "touch screen" in which the user provides input by tapping or writing directly on the display device. Touch screens can display icons or menus or can display other input metaphors such as a keyboards or response buttons. The user can select a menu item, icon, keyboard key, or response button, for example, by tapping on the display device in the input area associated with the desired item, icon, key, or button. The displayed keyboard or button can enable the user to enter various pieces of information such as but not limited to telephone numbers, response to display commands, and menu selections.

Other devices can be equipped with handwriting recognition software which enables the user to write alphanumeric characters onto an input area with a stylus. Handwriting recognition software within the device then attempts to interpret and recognize alphanumeric characters drawn by the user with the stylus on the input area. Generally, the information that is input may be displayed on a graphical display, such as but not limited to a liquid crystal display (LCD). In addition, the graphical display may be used to display menus or various command prompts as well as other pieces of information, such as but not limited to numbers, names, messages, menu functions, settings, and other application information such as timers or altimeters. As such, the system may be used to interact with various pieces of information displayed on the graphical display.

Touch screen user interfaces can themselves be used to display graphical user interfaces. For example, such touch screens may take the form of a virtual keyboard displayed on a graphical display wherein a discrete input area of the display corresponds to each key of a keyboard functions via a touch screen mechanism. These touch screen user interfaces are designed to be more intuitive and easier to use in comparison to hardware input user interfaces.

One characteristic all of these input/display devices share is that the user interface input metaphor and means can be reconfigured to meet specific applications. Often times these user interfaces are employed in mobile devices such as mobile telephones or personal digital assistants. The display devices associated with mobile devices are typically relatively small in size, particularly when compared with the display devices of less mobile systems such as a personal computer. Due at least in part to this small size, however, in some situations the graphical display and/or touch interfaces can be difficult to use. Certain environmental conditions, such as motion or trembling, can further increase the ease-of-use and accuracy problems. Unfortunately, it has been difficult to combat the problems associated with a smaller size input device and the typical movement and environmental conditions often present when a mobile device, such as a mobile telephone or personal digital assistant is used. Although data and commands may be entered via the virtual keyboard, icon, menu, or handwriting recognition system, the entry speed is reduced, the discomfort level is increased, and the error rate greatly increased relative to having used a full sized keyboard or to operation of the keyboard or input device under normal conditions, i.e. no movement.

One such situation where graphical display touch interfaces are often difficult to use is where the user is in motion, such as where the user is walking and thus the graphical display itself is in motion. Another situation where the graphical display touch interface is difficult to utilize is where the user is sitting in a vehicle and thus the graphical display touch interface is vibrating or trembling. In such situations, the user often is unable to focus on the moving graphical display touch interface or is unable to actuate the graphical display touch interface for example via a stylus or the user's finger.

Thus, there is a need in the art for a user interface that combines display and input devices in an adaptable manner to address the problems associated with theses devices to achieve added benefits such as comfort and ease-of-use.

SUMMARY OF THE INVENTION

One embodiment of the invention relates to a user interface which is adaptable. The user interface is capable of responding to a stimulus detected via a sensor. One or more sensors capable of detecting one or more types of stimuli may be utilized in accordance with the principles of the present invention. In one embodiment, the user interface displays graphical metaphors such as icons, menu items, a virtual keyboard, and/or response buttons on a touch screen, wherein the metaphors' configuration and display characteristics such as size are altered in response to a stimulus such as motion.

Devices in accordance with the principles of the present invention include a user interface that is adaptable to stimulus. Devices made in accordance with the principles of the present invention may include but are not limited to mobile electronic devices such as mobile telephones and personal digital assistants.

DETAILED DESCRIPTION OF THE PREFERRED EMBODIMENTS

One embodiment of the present invention relates to the use of an adaptable user interface that solves problems associated with the prior art by providing an interface that is comfortable and easy-to-use.

In order to provide these added benefits, a user interface in accordance with the principles of the present invention includes a means for situational awareness that can be used to adapt the user interface to the current environment. For example, a sensor may be used for sensing an environmental condition, such as motion, which causes the user interface to adapt, such as by increasing the user input area of the user interface to make it easier for the user to provide input while the device is trembling. The sensor can also be configured to sense when the device has stopped moving and/or trembling and the user interface can then be returned to a "normal" mode of operation.

Figure 1:
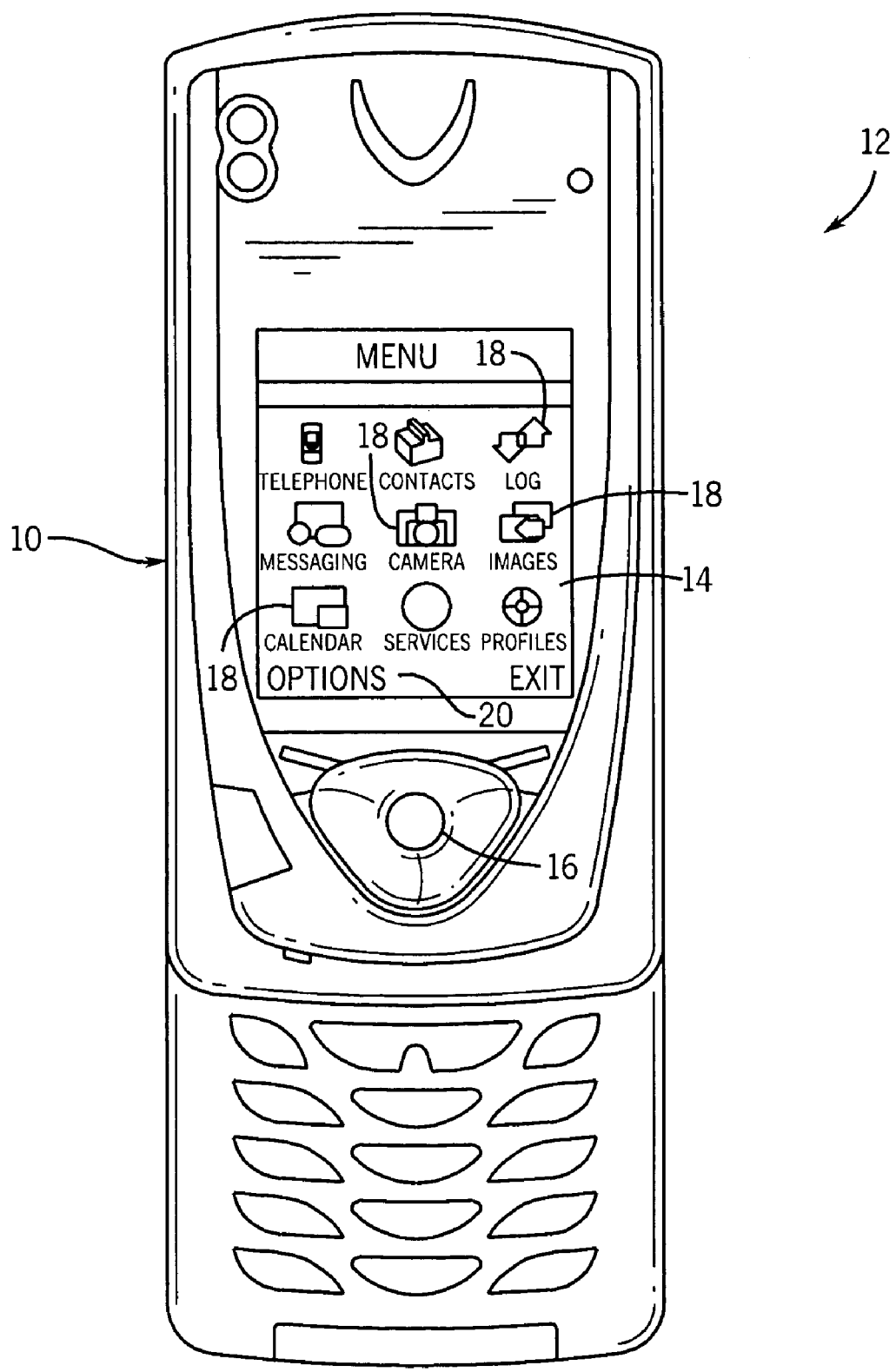
FIG. 1 is an illustration of one embodiment of a device including an adaptable user interface input in accordance with the principles of the present invention.

Referring now to the accompanying drawings, FIG. 1 illustrates one possible application of an adaptable user interface according to the present invention. FIG. 1 illustrates an adaptable user interface 10 incorporated into a mobile telephone 12. The adaptable user interface 10 includes a display screen 14 and a pointer control device 16. The display screen 14 provides a graphical user interface by displaying icons 18, menus 20, lists, etc. which the user can select by manipulating the pointing device 16. In this case, the pointing device 16 comprises a joystick-type control for navigating a pointer over the desired item to be selected.

The mobile telephone 12 can include a sensor for sensing an environmental condition and a controller for adapting the user interface to a sensed environmental condition. The sensor may include, but is not limited to, one or more of any of the following accelerometers, motion detectors, vibration detectors, conductive spheres and combinations thereof. In some embodiments, the sensor comprises an array of sensors of various types. Physical sensors, logical sensors, or a combination thereof may be utilized. The sensors in accordance with the principles of the present invention can be capable of returning scalar, vector, or symbolic values ($V_{xt}$, where x represents the specific sensor's preassigned number and t represents time) from a set universe of possible values (the domain P of possible values). For example, a device in accordance with the principles of the present invention may comprises sensors capable of detecting whether the device is in motion.

Another possible sample universe of values (for illustrative purposes only and not to be interpreted as limiting the scope of the invention) in a systems using one sensor for detecting motion can include three possible outputs: either a 2 indicating an increase in the appropriate environment condition (i.e. motion), a 0 indicating a decrease, or a 1 indicating no change relative to the last time interval measured.

TABLE 1

Sample Universe of Sensor Signals and Interface Responses

| | Universe of Responses for time (T) | | |
|---|---|---|---|
| Motion $V_{1t}$ | 0 (Less Movement) | 1 (No Change in Motion) | 2 (More Movement) |
| OUTCOME | Adaptive State (Decrease response in user interface) | Resting State (No change to user interface) | Adaptive State (Increase response in user interface) |

The sensor may be part of a more complex architecture. For example, a user interface in accordance with the principles of the present invention may utilize hardware, such as sensors, as well as software, such as various applications, computer program products, or scripts, in combination to establish a current status as well as to interpret any changes to that status.

In some embodiments the user interface is utilized in a device having a global positioning system (GPS). The GPS is adapted to function as a motion sensor. For example, the GPS can output coordinates to a counter which is capable of determining from the changes in the global position of the device whether the device is in motion or at rest.

In some embodiments, a motion sensor is utilized which is capable of detecting vibrations. For example, a sensor may be used which comprises a conductive sphere disposed in a cylindrical housing and adapted to move within the cylindrical housing to detect motion. The cylindrical housing contains a multitude of circuits which are capable of being shorted when in contact with the conductive sphere.

In one embodiment, the user interface 10 adapts in response to a signal from the sensor. The user interface 10 may adapt by switching between different pre-established modes based upon the signal from the sensor. The pre-established modes can be preset or can be configured or reconfigured by the user. Such modes may include, but are not limited to, changes in the input area, re-arrangement of the display contents, changes in sensitivity of the pointer control device 16, or combinations thereof. For example, the user interface 10 may operate in a "normal mode" when motion or vibration is not sensed, and it may switch to a "mobile mode" adapting the user interface 10 to compensate for motion when motion is detected. The sensed "motion" can be in the form of actual motion, vibration, trembling, or any other movement of the mobile device.

Figure 2:
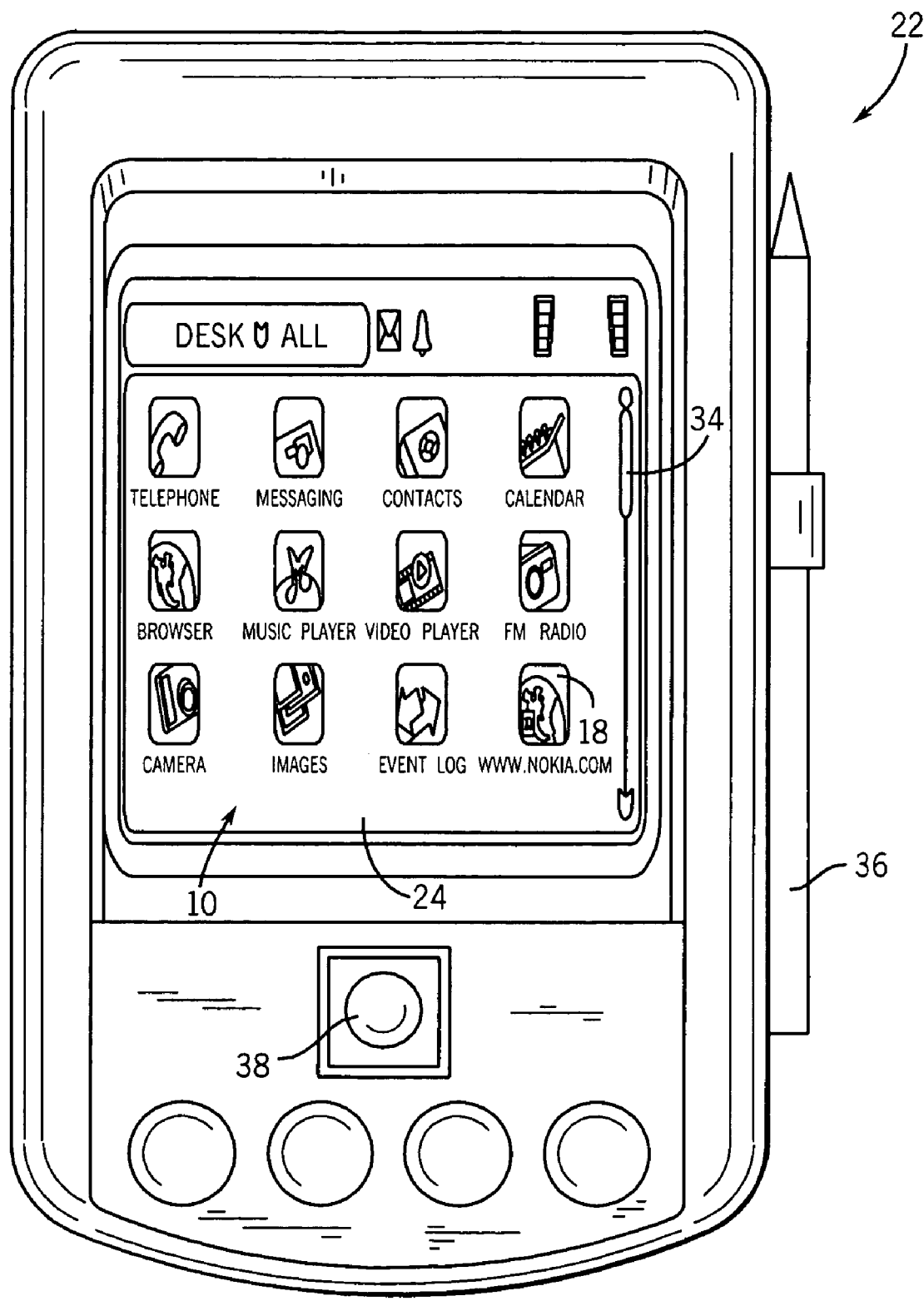
FIG. 2 is an illustration of another embodiment of a device including an adaptable user interface input in accordance with the principles of the present invention.
Figure 4:
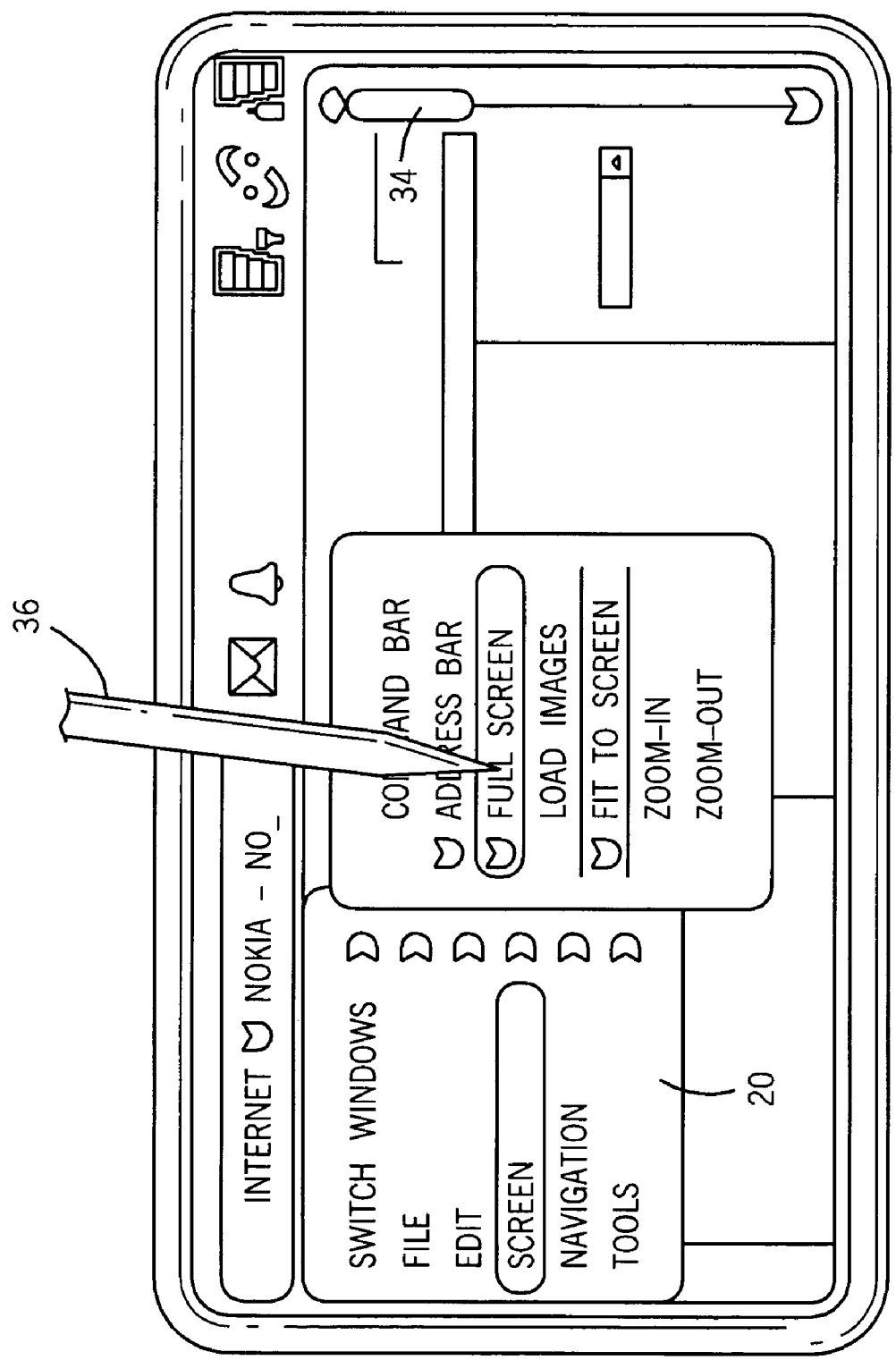
FIG. 4 is an illustration of another embodiment of a user interface in accordance with the principles of the present invention.
Figure 5:
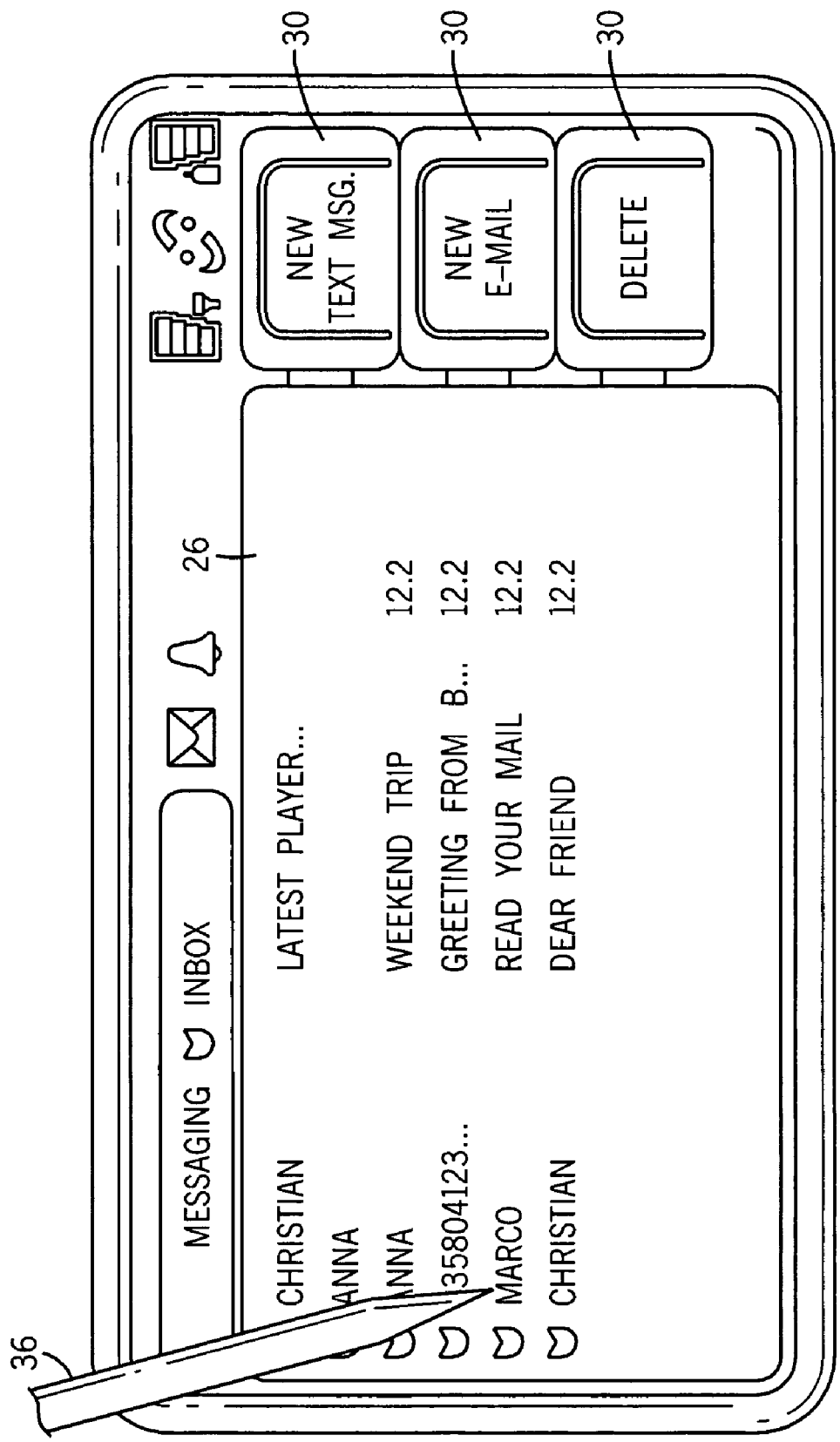
FIG. 5 is an illustration of another embodiment of a user interface in accordance with the principles of the present invention.
Figure 6:
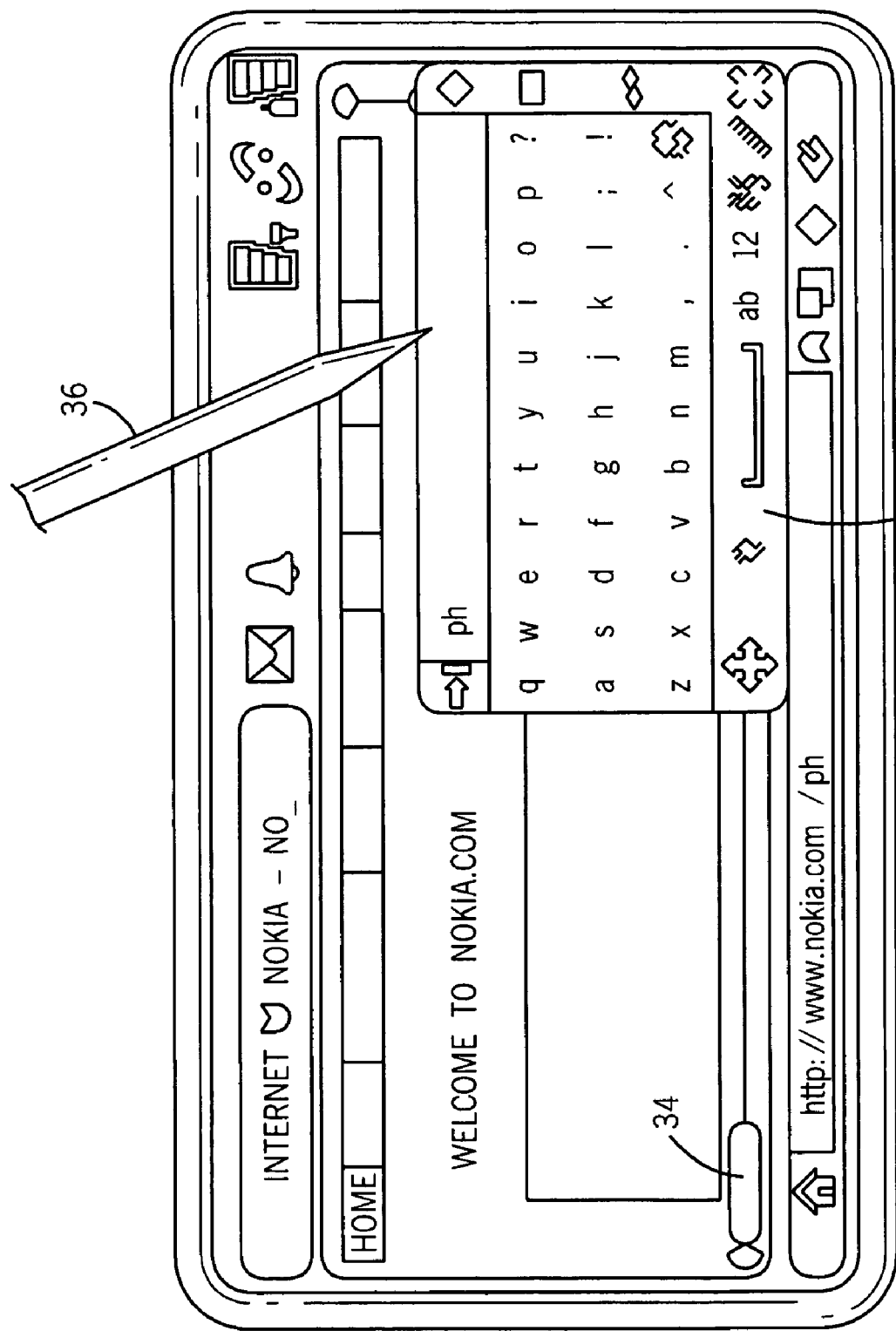
FIG. 6 is an illustration of another embodiment of a user interface in accordance with the principles of the present invention.

Another possible application of an adaptable user interface input device is shown in FIG. 2. An adaptable user interface input device 10 according to the present invention can be incorporated into a personal digital assistant (PDA) or other mobile media device 22, such as a mobile electronic game device or mobile multi-function device such as the Nokia 7700 media device. In this embodiment, the adaptable user interface 10 includes a touch screen display 24. The touch screen display 24 provides a graphical user interface by displaying icons 18 (see also FIG. 3), menus 20 (see FIG. 4), lists 26 (see FIG. 5), a virtual keyboard 28 (see FIG. 6), response buttons 30 (see FIG. 5), and/or a handwriting recognition input area 32 (see FIG. 7), as well as various display control tools such as scroll bars 34, etc. A stylus 36 can be used to select or manipulate the items displayed on the tough screen display 24. In addition, a trackball pointing device 38 can be provided for manipulating a pointer on the touch screen display 24 as an alternative means of providing user input.

Figure 3:
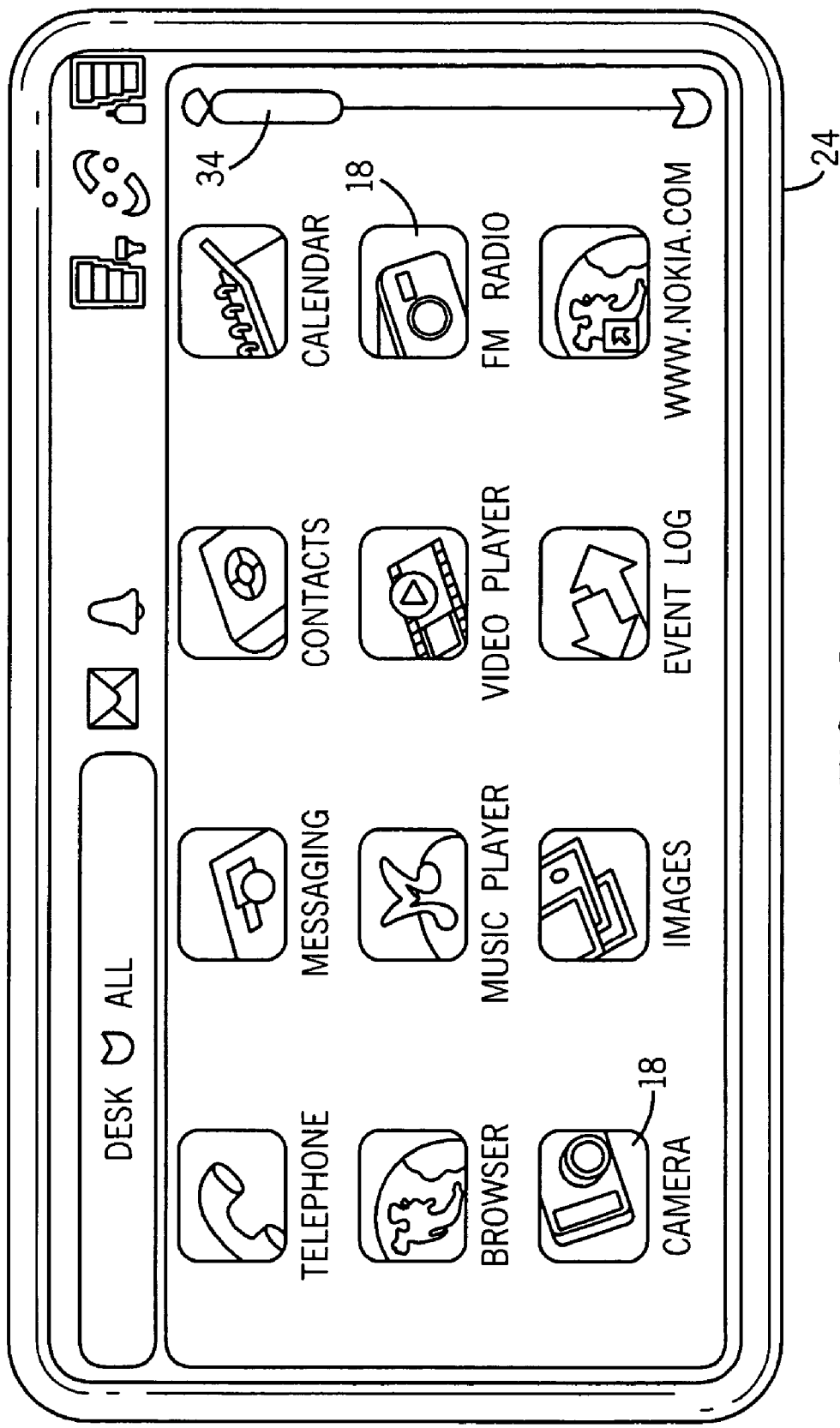
FIG. 3 is an illustration of one embodiment of a user interface in accordance with the principles of the present invention.
Figure 7:
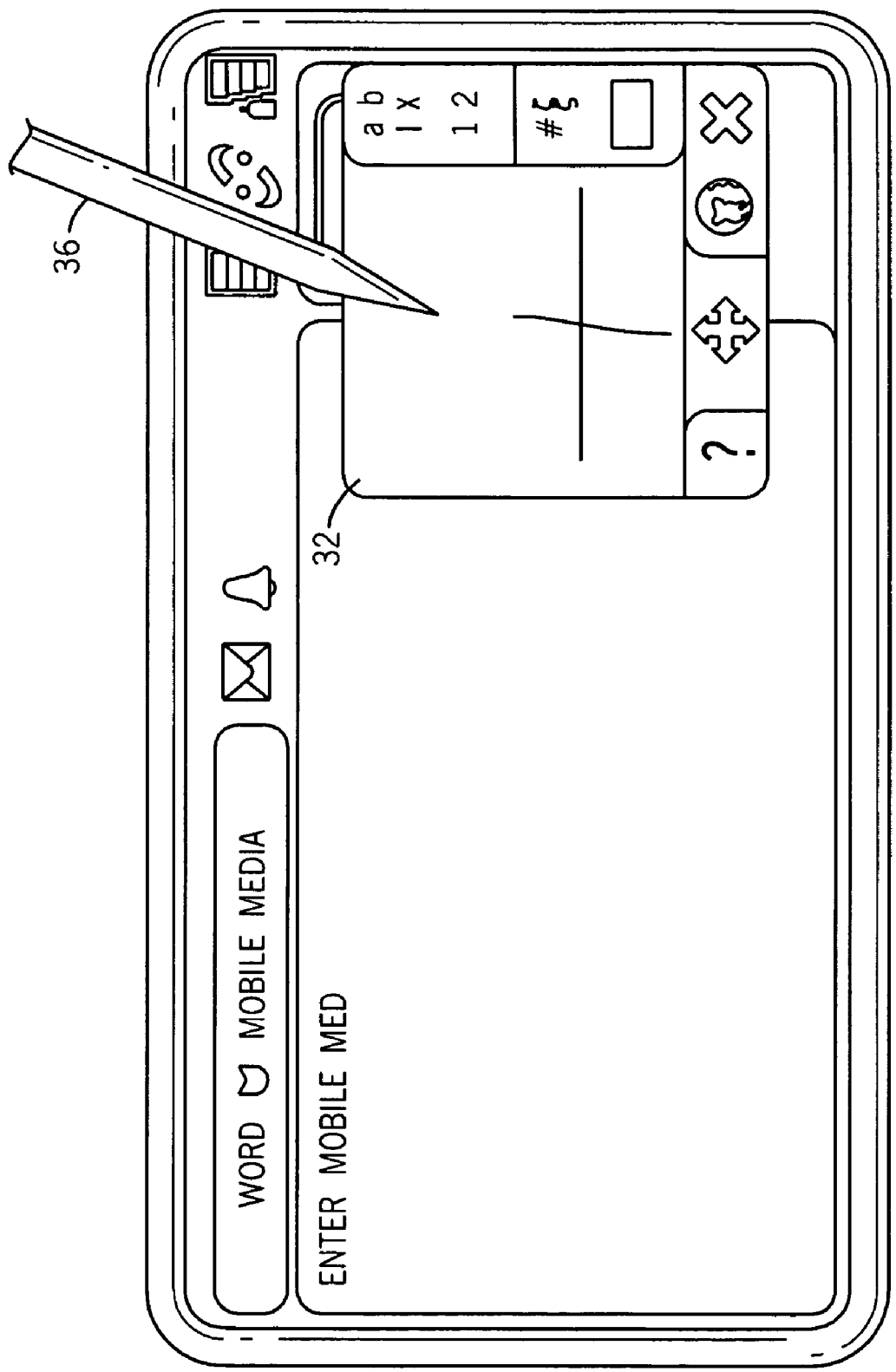
FIG. 7 is an illustration of still another embodiment of a user interface in accordance with the principles of the present invention.

As with the previous embodiment, a sensor 38 (see FIG. 8) can be included for sensing an environmental condition, such as motion or trembling. The user interface 10 can than be adapted to accommodate for the sensed environmental condition as described above. For example, in the case of icons 18 as shown in FIG. 3, the size of each icon 18 can be increased thus increasing the user input area for each icon 18 on the touch screen display 24 in response to the sensor detecting motion or trembling. This will enable the user to more easily select an icon 18. In addition, the size of the display control tools, such as the scroll bar 34, can also be increased for ease-of-use. The same can be done for the menus 20 (FIG. 4), lists 26 and response buttons 30 (FIG. 5), virtual keyboard 28 keys (FIG. 6), and handwriting recognition input area 32 (FIG. 7).

Various other adaptations can also be made to increase accuracy and ease-of-use in response to sensed environmental conditions. For example, the touch screen display 24 sensitivity can be decreased when motion or trembling is sensed to reduce the number of inadvertent select commands caused by the user accidentally touching the stylus 36 to the touch screen display 24 due to accidental movement of the mobile media device 22. In addition, the items displayed on the touch screen display 24 can be rearranged in various different ways or even disabled and/or removed in order to accommodate various environmental conditions.

In one embodiment where a touch screen display 24 displays a virtual keyboard 28, the graphical display of the virtual keyboard 28 may be altered in response to a signal from the sensor 38. In one embodiment, where the mobile media device 22 includes an array of sensors, the keyboard 28 can be altered in various predetermined ways depending on the specific set of signals received at that time. For example, where an accelerometer and light sensor are used, the graphical display of the keyboard may be changed in response to a set of signals indicating motion and deceased light by increasing the user input area size of the keyboard keys and increasing the contrast and brightness of the display. In accordance with the principles of the present invention the keyboard 28 layout could be rearranged in response to certain stimuli. In addition, the content of the keyboard 28 could be altered such as by deleting the least frequently used keys or by altering the sensitivity of the touch screen display 24 itself. A time interval between user interface input adaptations can be incorporated into the device so that the user interface input does not change too often adversely affecting the ease-of-use of the device.

The sensor can include, for example but not limited to an accelerometer or an array of accelerometers capable of detecting motion in three dimensions as represented by a x, y, and z axis. In response to the appropriate stimulus, the sensors output a signal which is interpreted by the device as either requiring an adaptation in the user interface 10 or not. For example, the user interface 10 may be adapted in response to a signal indicating motion by reconfiguring the arrangement of the individual keys on the keyboard 28, increasing the size of the input area of each key, and/or decreasing the sensitivity of the touch screen display 24.

Figure 8:
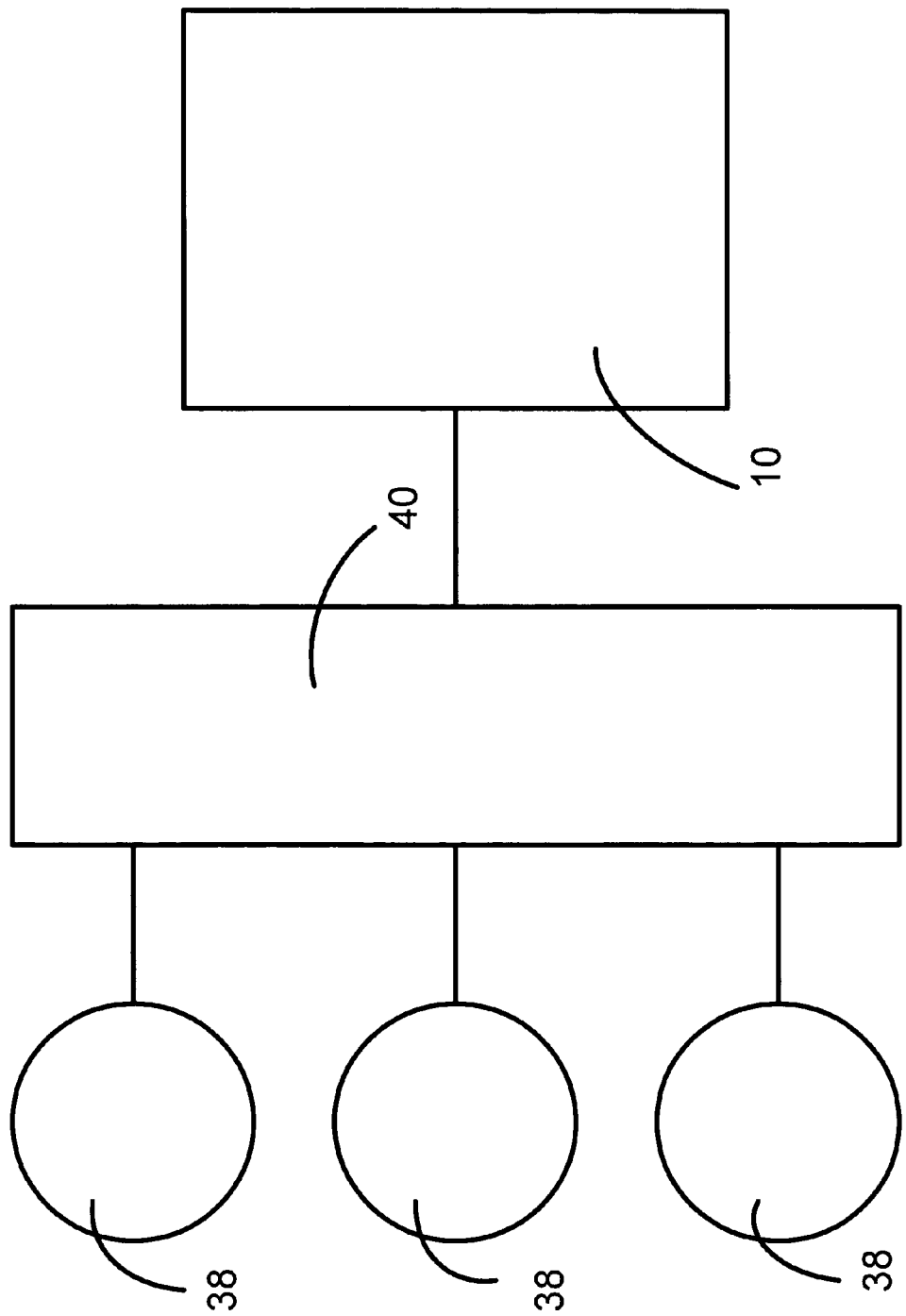
FIG. 8 is a block diagram of one embodiment of a sample sensor architecture in accordance with the principles of the present invention.

A block diagram illustrating one embodiment of a possible sensor architecture according to the present invention is shown in FIG. 8. FIG. 8 illustrates that multiple sensors 38 can be used for sensing various environmental conditions. The sensors 38 can be connected to a controller 40 which receives and processes signals from the sensors 38. The controller 40 is connected to the adaptable user interface 10 and can be configured to determine whether to change the state or functionality of the user interface 10 based on various conditions sensed by the sensors 38 and initiate the change if required.

Figure 9:
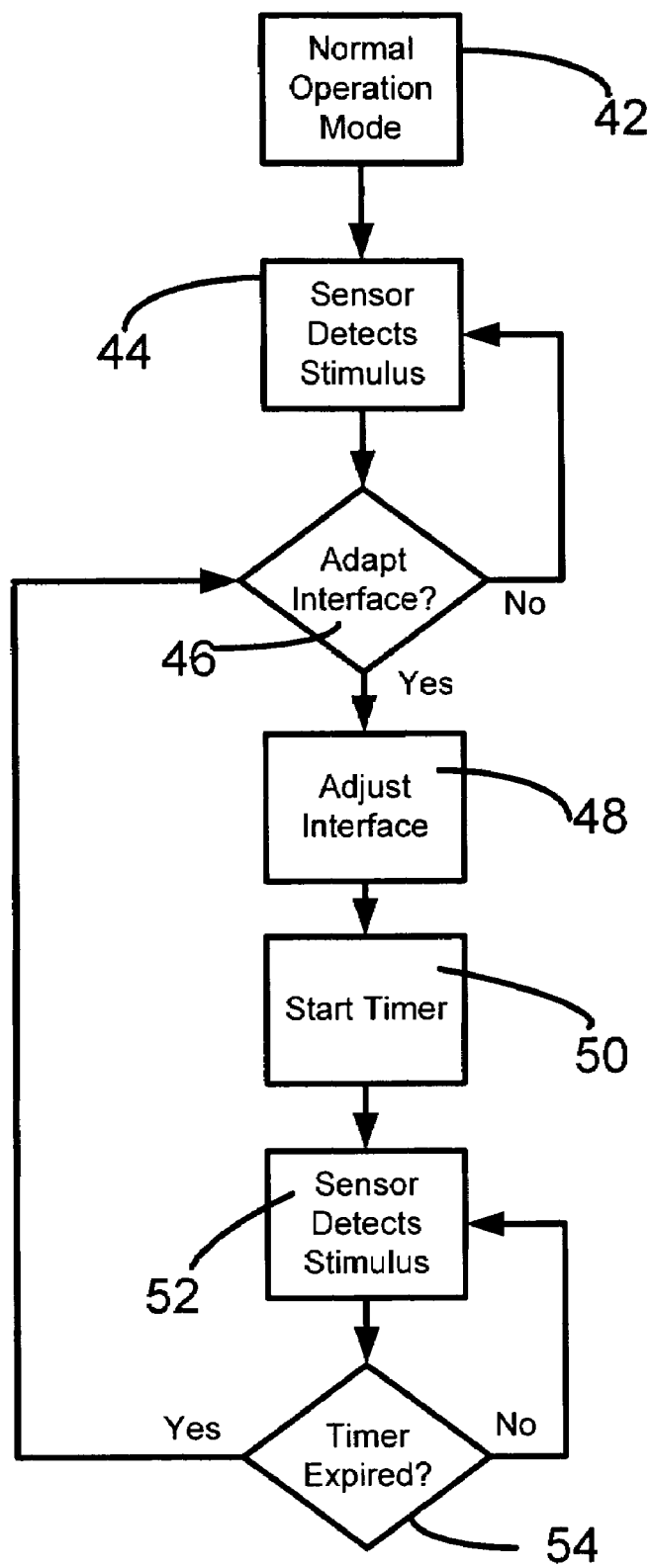
FIG. 9 is a flowchart depicting one embodiment of a routine for adapting a user interface input device in accordance with the principles of the present invention.

FIG. 9 illustrates one example of a routine used by the controller 40 for determining whether the user interface 10 needs to be adapted to a sensed environmental condition. The device can begin operation in a "normal" mode (step 42) which provides a default set of user input options. Upon detection of a stimulus by the sensor (step 44), the controller determines if the stimulus detected by the sensor requires an adaptation of the user interface (step 46). If it does not, the routine goes back to step 44 to wait for the sensor to detect another stimulus. If it does, the user interface is adapted to accommodate the sensed environmental condition (step 48) and a timer is stated (step 50) indicating how long it has been since the user interface has been adapted. Upon detection of another stimulus by the sensor (step 52) the timer is checked to determine if it reached a predetermined minimum amount of time since the last user interface adaptation (step 54). If a minimum amount of time has passed, the routine returns to step 46 to determine if the user interface should be adapted, and if so the user interface is adapted (step 48) to the newly sensed environmental condition, the timer is reset (step 50) and the routine waits for the sensor to detect the next stimulus (step 52). The sensors can be periodically polled to check the current status of environmental conditions.

The foregoing description of the invention outlines exemplary embodiments of an adaptive user interface system and method. For purposes of explanation only, numerous specific details are set forth in order to provide a thorough understanding of the present invention. It is evident, however, to one skilled in the art that the exemplary embodiments may be practiced without these specific details. In other instances, structures and devices are shown in block diagram or tabular form in order to also further facilitate description of the exemplary embodiments.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims as understood by one of ordinary skill in the art.

What is claimed is:

1. An adaptable user interface input comprising:
    at least one sensor capable of sensing motion;
    a user interface input device in communication with the at least one sensor , the user interface input device being configured to display input metaphors, provide input by at least one of selecting an input metaphor and performing handwriting recognition, and adapt to motion sensed by the at least one sensor; and
    a timer for tracking a predetermined minimum amount of time between user interface input device adaptation such that the user interface input device is adapted only after the minimum amount of time has elapsed since the last time the user interface input device was adapted.

2. The user interface of claim 1, wherein the user interface includes a mode of operation and the mode of operation being configured to switch from a normal mode of operation to a mobile mode of operation in response to motion sensed by the at least one sensor.

3. The user interface of claim 2, wherein the at least one sensor is further capable of sensing a lack of motion and the mode of operation of the user interface is configured to switch from the mobile mode of operation to the normal mode of operation in response to a sensed lack of motion by the at least one sensor.

4. The user interface of claim 1, wherein the display device and the input device comprise a touch screen.

5. The user interface of claim 1, wherein the user interface input device further comprises a handwriting recognition user input area.

6. The user interface of claim 1, wherein the input metaphors comprise icons, menus, response buttons, lists, display control tools, and/or a virtual keyboard.

7. The user interface of claim 1, wherein size of the input metaphors can be adjusted based on motion sensed by the at least one sensor.

8. The user interface of claim 1, wherein the sensitivity of the input device can be adjusted based on motion sensed by the at least one sensor.

9. The user interface of claim 1, wherein the certain input metaphors can be rearranged, removed, or added based on motion sensed by the at least one sensor.

10. The user interface of claim 5, wherein the size and/or the sensitivity of the handwriting recognition user input area can be adjusted based on motion sensed by the at least one sensor.

11. The user interface of claim 2, wherein the mobile mode of operation includes a preset user interface.

12. The user interface of claim 2, wherein the mobile mode of operation is configurable by a user.

13. A mobile device comprising:
at least one sensor capable of sensing motion;
an adaptable user interface, the user interface including a user interface input device in communication with the at least one sensor, the user interface input device being configured to display input metaphors, provide input by at least one of selecting an input metaphor and performing handwriting recognition, and adapt to motion sensed by the at least one sensor; and
a timer for tracking a predetermined minimum amount of time between user interface input device adaptation such that the user interface input device is adapted only after the minimum amount of time has elapsed since the last time the user interface input device was adapted.

14. The mobile device of claim 13, wherein the device comprises a mobile communications device.

15. The mobile device of claim 13, wherein the device comprises a mobile telephone.

16. The mobile device of claim 13, wherein the device comprises a mobile media device.

17. The mobile device of claim 13, wherein the device comprises a personal digital assistant.

18. The mobile device of claim 13, wherein the size of the input metaphors, the sensitivity of the input device, and/or the arrangement and types of metaphors can be adjusted based on motion sensed by the at least one sensor.

19. The mobile device of claim 13, wherein the user interface input device further comprises a touch screen.

20. The mobile device of claim 13, wherein the user interface input device further comprises a handwriting recognition user input area.

21. The mobile device of claim 13 wherein the at least one sensor is a sensor selected from the group consisting of: an accelerometer, a motion detector, a vibration detector, a conductive sphere, or a global positioning system.

22. A method for adapting a user input device interface to motion comprising:
sensing a first change in motion of the user interface input device, the user interface input device being configured to display input metaphors and to provide input by at least one of selecting an input metaphor and performing handwriting recognition;
determining if the user interface input device should be adapted in response to the first sensed change;
if required, adapting the user interface input device in response to the first sensed change;
starting a timer after adapting the user interface input device;
sensing a second change in motion;
determining if a predetermined amount of time has elapsed since the user interface input device has been adapted; and
if the predetermined amount of time has elapsed:
determining if the user interface input device should be adapted in response to the second change; and
if required, adapting the user interface input device in response to the second change.

23. The method of claim 22 wherein the user interface input device includes a mode of operation and wherein the step of adapting the user interface input device further comprises changing between either a normal mode of operation and a mobile mode of operation in response to the sensed change.

24. The method of claim 22, wherein the adapting of the user interface input device further comprises adjusting the size of input metaphors displayed on the user interface.

25. The method of claim 22, wherein the adapting of the user interface input device further comprises adjusting the sensitivity of the user interface to input commands.

26. The method of claim 22, wherein the-adapting of the user interface input device further comprises rearranging, removing, and/or adding input metaphors to the user interface.

27. The method of claim 23, wherein the mobile mode of operation is preset.

28. The method of claim 23, wherein the mobile mode of operation is configurable by a user.

29. A computer program product, embodied on a computer-readable medium comprising:
computer code configured to:
sense a first change in motion of a user interface input device, the user interface input device being configured to display input metaphors and to provide input by at least one of selecting an input metaphor and performing handwriting recognition;
determine if the user interface input device should be adapted in response to the first sensed change;
if required, adapt the user interface input device in response to the first sensed change;
start a timer after adapting the user interface input device;
wherein the computer code to sense the first change in motion further comprises computer code to sense a second change in motion;
wherein the computer code to determine if the user interface input device should be adapted further comprises computer code to determine if a predetermined amount of time has elapsed since the user interface input device has been adapted and if the predetermined amount of time has elapsed to determine if the user interface input device should be adapted in response to the second change; and wherein the computer code to adapt the user interface input device further comprises computer code to adapt the user interface in response to the second change.

30. The computer program product of claim 29, wherein the computer code further comprises a normal mode of operation and a mobile mode of operation.

31. The computer program product of claim 29, wherein the computer code to adapt the user interface input device further comprises computer code to adjust the size of input metaphors displayed on the user interface input device.

32. The computer program product of claim 29, wherein the computer code to adapt the user interface input device further comprises computer code to adjust the sensitivity of the user interface input device to input commands.

33. The computer program product of claim 29, wherein the computer code to adapt the user interface input device further comprises computer code to rearrange, remove, and/or add input metaphors to the user interface input device.

34. The computer program product of claim 30, wherein the mobile mode of operation is preset.

35. The computer program product of claim 30, further comprising computer code to allow the user to configure the mobile mode of operation.

* * * * *